June 24, 1947.     F. J. FIELITZ     2,422,722
EXTRUSION APPARATUS
Filed March 5, 1946
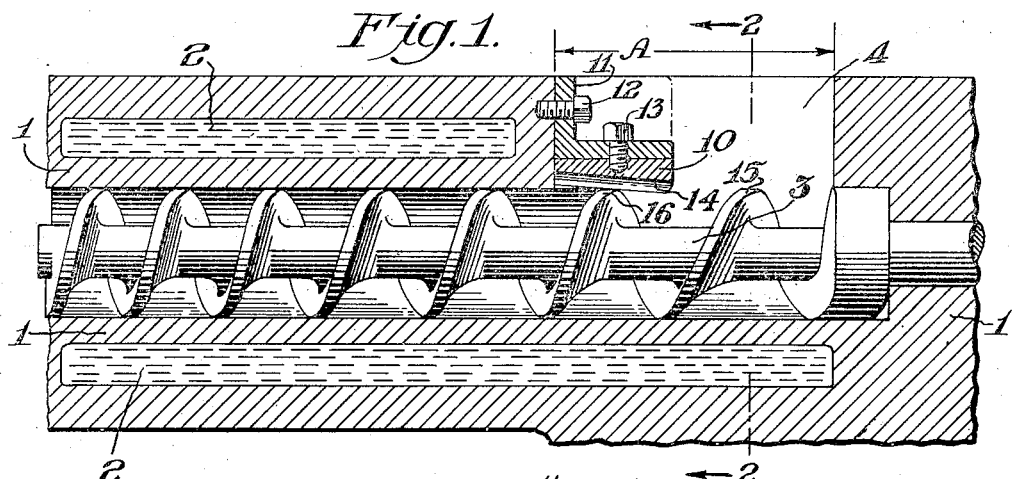
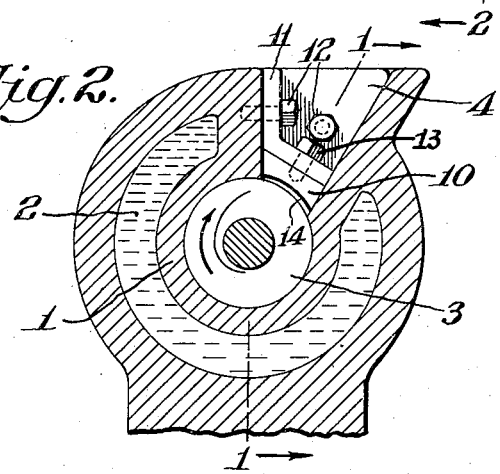
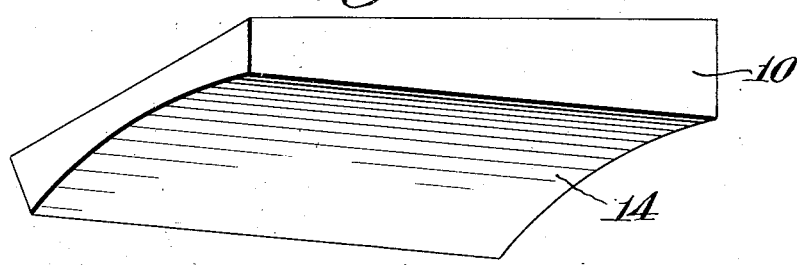
*INVENTOR*
*FREDERICK J. FIELITZ*
BY
*ATTORNEY*

Patented June 24, 1947

2,422,722

UNITED STATES PATENT OFFICE 2,422,722

EXTRUSION APPARATUS

Frederick J. Fielitz, North Arlington, N. J., assignor to E. I. du Pont de Nemours & Company, Wilmington, Del., a corporation of Delaware Application March 5, 1946, Serial No. 652,087

3 Claims. (Cl. 18—12)

This invention relates to improvements in extrusion apparatuses and, more particularly, to the hopper assembly in screw stuffers used for extruding plastics.

The conventional screw stuffer comprises a cylinder, a screw centrally positioned and rotatable therein for extruding plastic from one end of the cylinder, and a hopper adjacent the other end of the cylinder through which the plastic is fed to the screw. In these screw stuffers, plastic stock is fed by the operator into the hopper, from which point the stock is engaged by the screw and directed down into the cylinder to be extruded. A disadvantage of this method of operation is that usually plastic stock pinched off between the screw and the edge of the hopper builds up in the hopper until it prevents further feeding of new stock by clogging the hopper. Another disadvantage is that a material variation in the feeding of certain plastic stock, particularly cellulose nitrate, results in variation in the caliper of the product due to varying extrusion pressure. Such a variation in feeding, when inflammable stock is being extruded, sometimes unduly compresses air pockets in the stock and causes it to flash, thereby jeopardizing personnel and equipment.

It will be seen, therefore, that the conventional screw stuffer not only is inefficient to a certain extent due to the clogging up of the hopper and also delivers a certain amount of imperfect extruded stock but it also exposes the operator to the danger of the stock flashing and, in addition, the operator in endeavoring to unclog the hopper while the screw stuffer is in operation, runs the risk of getting his hands caught in the screw. This is a not infrequent cause of industrial accidents in shops using these machines.

An object of the present invention is to provide an improved hopper assembly for screw stuffers. A further object is to provide an improvement in the construction of the hopper of a screw stuffer which will increase the uniformity and rate of feed of plastic, thus increasing the efficiency of the apparatus and improving the product extruded therefrom. A further object is to provide such a construction which will tend to prevent an operator from getting his hands caught in the screw while feeding plastic into the hopper. Other objects will be apparent from the description of the invention given hereinafter.

The above objects are accomplished according to the present invention by mounting in the hopper of a screw stuffer a device for regulating the feed of plastic into the cylinder of the screw stuffer, the device essentially comprising a plate rigidly mounted in the bottom of the hopper to close off a portion of it and at the same time to form a relief zone between the plate and the screw in which there is an extrusion compression exerted on the plastic somewhat less than the extrusion compression exerted on the plastic in the cylinder.

More specifically, the invention comprises a plate mounted in the hopper of a screw stuffer at the bottom thereof and closing off a portion, up to one-half, of the hopper bottom at the end nearest the discharge end of the cylinder of the screw stuffer, the face of the plate adjacent the screw of the screw stuffer having a radial curvature substantially the same as the curvature of the wall of the cylinder. The plate is positioned with the curved face approximately parallel to the cylinder wall and the distance, measured radially with respect to the axis of the screw, between the crests of the screw and the plate increasing in the direction of extrusion, thus forming the desired relief zone.

The invention will be more fully described with reference to the accompanying drawing wherein identical reference numerals are used to designate similar parts in the various views and wherein:

Fig. 1 is a section on the line 1—1 of Fig. 2 of a portion of a screw stuffer in which is installed a specific embodiment of the instant invention;

Fig. 2 is a section on the line 2—2 of Fig. 1; and

Fig. 3 is a perspective view of the plate 10 shown in Figs. 1 and 2.

Referring particularly to Figs. 1 and 2, reference numeral 1 designates the cylinder of a conventional screw stuffer provided with the heating jacket 2. The usual screw 3 is centrally positioned and rotatably mounted in the cylinder 1, Fig. 1 merely showing that portion of the screw stuffer necessary to illustrate the present invention. The delivery end of the stuffer is to the left as viewed in Fig. 1. The cylinder 1 is provided with the conventional hopper 4, frequently made as an integral part therewith but not necessarily so, which provides the opening through which plastic is fed to the screw 3 which, in turn, forces it through the cylinder 1. It should be noted that the length of the hopper opening is the distance A as indicated in Fig. 1. The construction so far described is that of the well known screw stuffers used in the plastic art.

Mounted in the hopper 4 is the device of the present invention for regulating the feed of plastic into the cylinder 1. It essentially comprises the plate 10 which is rigidly held in position at the bottom of the hopper 4 by the trihedral supporting iron 11 attached to the walls of the hopper 4 by the screws 12, the plate 10 being secured to the iron 11 by one or more screws 13. The supporting iron 11 and the plate 10 may be made as an integral piece if preferred. The plate 10 is shown in perspective in Fig. 3 and is provided with a curved face 14, the radial curvature of this face 14 being substantially the same as that of the wall of cylinder 1. The plate 10 is also tapered as illustrated in Fig. 3 and, more clearly, in Fig. 1.

By referring to Figs. 1 and 2, it will be seen that the plate 10 is positioned so that the face 14 is approximately parallel to the wall of the cylinder 1 and the edge of the plate 10 farthest from the delivery end of the cylinder 1 clears the crest 15 of the screw 3; the plate 10 closes off completely a portion of the bottom of the hopper 4 at the end thereof nearest the discharge end of the cylinder 1. Actually, it is preferred that the plate 10 be positioned so that its curved face 14 is not precisely parallel to the wall of the cylinder but rather forms the arc of a circle slightly eccentric in the direction of the screw turns (see direction arrow, Fig. 2) with respect to the circle formed by the wall of the cylinder 1. This slight eccentricity is shown in Fig. 2. The reason for having the plate positioned with this slight eccentricity is that it tends to increase the smooth operation of the screw stuffer but the apparatus functions satisfactorily if the plate 10 is positioned so that its curved face 14 is exactly parallel to the wall of cylinder 1, that is, the curved face 14 forms the arc of a circle exactly concentric with respect to the circle formed by the wall of cylinder 1.

An essential feature of the present invention is the positioning of the plate 10 so that the distance between the face 14 and a line running along the crests 15 and 16 of the screw 3, measured radially with respect to the axis of the screw 3, increases in the direction of extrusion. It has been found that, under normal circumstances, the distance should increase along a line running at an angle of 1° to 10° to the axis of screw 3, preferably at an angle of 4° to 8° and, specifically, at an angle of 5°.

A second feature of the invention is that the plate 10 at the edge farthest from the delivery end of cylinder 1 should be spaced slightly from the crest of the screw 3. That is, measured radially with respect to the axis of the screw 3, there should be an appreciable clearance between the face of plate 10 and the crest 15 of screw 3, as viewed in Fig. 1. Usually, this clearance should be between 1/64 and 1/4 of an inch and, preferably, between 1/32 and 1/8 of an inch, with a distance of 3/32 of an inch specifically preferred.

It will be noted that the plate 10 is positioned so as to block off a portion of the bottom of the hopper 4 at the end thereof nearest the delivery end of the cylinder 1 and, at the same time, to form a zone in combination with the screw 3 in which plastic fed into the hopper is put under appreciable extrusion compression but considerably less than that to which the plastic will be subjected in the cylinder 1 proper.

In operation, the plastic stock is fed into the hopper 4 and engaged by the screw 3 which forces it into the cylinder 1. Because of the plate 10, the excess stock is folded back upon the screw 3 in such a manner that stock left in the hopper 4 by one flute of the screw 3 is engaged by the following flute and carried under the plate 10, thus preventing build up of stock in hopper 4. The stock is then gradually and uniformly carried by the screw through the zone of lower extrusion compression into the cylinder 1 where it goes under full extrusion compression without the sudden and undesirably high compression frequently encountered in the conventional design screw stuffers.

While the invention has been described more or less with reference to the particular embodiment thereof illustrated in the drawing, it is by no means restricted to the specific construction shown. The proportion of the hopper bottom closed off by the plate 10 may be varied greatly but will not exceed one-half of the bottom of the hopper in any stuffer of normal design now on the market. It is not important that the plate 10 cover any particular proportion of the length of the screw 3. To form an effective zone of relatively low extrusion compression the plate will ordinarily close off at least one-fourth of the hopper although advantage of the present invention can be gained to a lesser extent by the use of a plate closing off even less of the hopper opening.

The spacing of the plate 10 above the screw 3 and the angle of the plate with respect to the axis of the screw have been indicated above as particularly adapted for the extrusion of cellulose nitrate stock at conventional temperatures, that is, with the stock fed into the hopper at about 180° F. and the cylinder maintained in the neighborhood of 210° F. Those skilled in the art will readily appreciate that the clearance of plate 10 above the crests of the screw 3 could be greater if it were desired to work stock of unusually stiff consistency or less if the stock were exceptionally plastic either due to its particular composition or the temperature employed. However, the measurements given afford a reliable guide for the plastics customarily worked in screw stuffers. The pitch and speed of the screw are also other but relatively minor factors in determining the optimum positioning of the plate 10 in any given circumstances. The specific manner in which the plate 10 is held in position in the hopper obviously is not critical in this invention.

This invention introduces many advantages in the art of extruding plastic materials by means of screw stuffers. Because of the fold-back action of the plate on the plastic stock, the rate of feeding and consequent rate of extrusion are increased significantly. Plastic is compressed in the cylinder of the stuffer gradually rather than suddenly and this greatly improves the appearance and properties of the extruded plastic products. Further, the extrusion of plastic in an apparatus constructed according to the present invention is much safer because the necessity for the operator to apply force in order to feed the stock into the cylinder of the stuffer has been substantially eliminated and, even if force is applied, the guard action of the plate tends to prevent the operator from getting a hand caught in the screw. Also, the possibility of inflammable plastic stock flashing has been minimized due to the uniform conveyance of the plastic into the cylinder.

It will be apparent that the present apparatus does not involve any appreciable initial expense and, as far as maintenance expense is concerned, the present invention adds nothing appreciable to this.

I claim:

1. A screw stuffer comprising a cylinder, a screw centrally positioned and rotatable therein for extruding plastic from one end of said cylinder, a hopper adjacent the opposite end of said cylinder through which plastic is fed to said screw, a device for regulating the feed of plastic into said cylinder, said device comprising a plate rigidly mounted in said hopper immediately above said screw and extending over a portion thereof and closing off a portion of said hopper at the side thereof nearest the discharge end of said cylinder, the face of said plate adjacent said screw having a radial curvature approximately the same as the curvature of the wall of said cylinder and the plate being positioned with said face approximately parallel to the wall of said cylinder and the distance, measured radially with respect to the axis of said screw, between the crests of said screw and said face increasing in the direction of extrusion whereby a relief zone is formed between said plate and screw in which there is an extrusion compression exerted on the plastic less than the extrusion compression exerted on the plastic in said cylinder.

2. A screw stuffer comprising a cylinder, a screw centrally positioned and rotatable therein for extruding plastic from one end of said cylinder, a hopper adjacent the opposite end of said cylinder through which plastic is fed to said screw, a device for regulating the feed of plastic into said cylinder, said device comprising a plate rigidly mounted in said hopper immediately above said screw and extending over a portion thereof and closing off a portion of said hopper bottom at the side thereof nearest the discharge end of said cylinder, the face of said plate adjacent said screw having a radial curvature approximately the same as the curvature of the wall of said cylinder and the plate being positioned with said face approximately parallel to the wall of said cylinder and the distance, measured radially with respect to the axis of said screw, between the crests of said screw and said face being from $1/64$ inch to $1/4$ inch at the edge of said plate farthest from the discharge end of said cylinder and increasing along a line at an angle of 1° to 10° to the axis of said screw whereby a relief zone is formed between said plate and screw in which there is an extrusion compression exerted on the plastic less than the extrusion compression exerted on the plastic in said cylinder.

3. A screw stuffer comprising a cylinder, a screw centrally positioned and rotatable therein for extruding plastic from one end of said cylinder, a hopper adjacent the opposite end of said cylinder through which plastic is fed to said screw, a device for regulating the feed of plastic into said cylinder, said device comprising a plate rigidly mounted in said hopper immediately above said screw and extending over a portion thereof and closing off a portion of said hopper bottom at the side thereof nearest the discharge end of said cylinder, the face of said plate adjacent said screw having a radial curvature approximately the same as the curvature of the wall of said cylinder and the plate being positioned with said face approximately parallel to the wall of said cylinder and the distance, measured radially with respect to the axis of said screw, between the crests of said screw and said face being approximately $3/32$ of an inch at the edge of said plate farthest from the discharge end of said cylinder and increasing along a line at an angle of approximately 5° to the axis of said screw whereby a relief zone is formed between said plate and screw in which there is an extrusion compression exerted on the plastic less than the extrusion compression exerted on the plastic in said cylinder.

FREDERICK J. FIELITZ.

REFERENCES CITED

The following references are of record in the file of this patent:

UNITED STATES PATENTS

| Number | Name | Date |
|---|---|---|
| 1,066,722 | Ganzhorn | July 8, 1913 |
| 1,066,723 | Ganzhorn | July 8, 1913 |

As many apparently widely different embodiments of this invention may be made without departing from the spirit and scope thereof, it is to be understood that the invention is not limited to the specific embodiments thereof except as defined in the appended claims.